W. C. JOHNSON.
ATTACHMENT FOR WHEELBARROWS.
APPLICATION FILED DEC. 29, 1908.
974,571.
Patented Nov. 1, 1910.
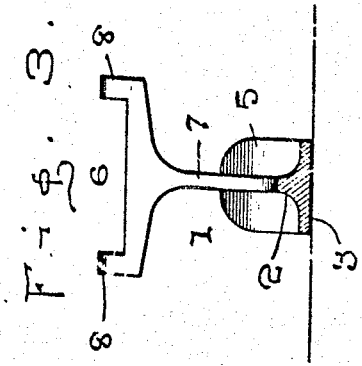
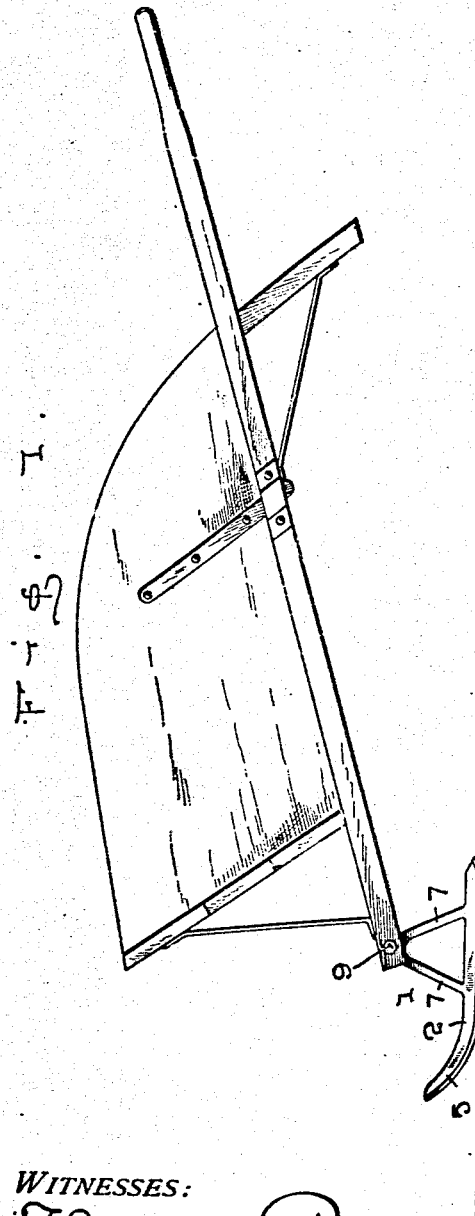
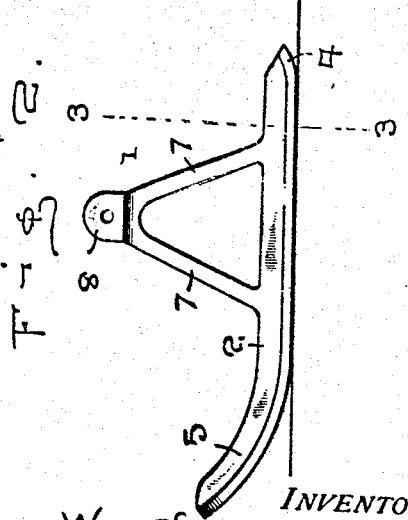
WITNESSES:
Thos. W. Riley
Marian Newcomb
INVENTOR
W. C. Johnson
BY W. J. Fitzgerald
Attorneys

UNITED STATES PATENT OFFICE.

WILLIAM C. JOHNSON, OF FENCE, WISCONSIN.

ATTACHMENT FOR WHEELBARROWS.

974,571.  Specification of Letters Patent.  Patented Nov. 1, 1910.

Application filed December 29, 1908. Serial No. 469,812.

*To all whom it may concern:*

Be it known that I, WILLIAM C. JOHNSON, a citizen of the United States, residing at Fence, in the county of Florence and State of Wisconsin, have invented certain new and useful Improvements in Attachments for Wheelbarrows; and I do hereby declare the following to be a full, clear, and exact description of the invention, such as will enable others skilled in the art to which it appertains to make and use the same.

My invention relates to new and useful improvements in wheel barrows, more especially attachments therefor. Said invention has for its object to provide, as above indicated, an attachment for wheel barrows, more especially for use in winter weather, as when snow and ice are upon the ground.

The invention also has for its object to carry out the aforesaid ends in a simple, inexpensive and effective manner.

Other objects and advantages will be hereinafter referred to and more particularly pointed out in the claims.

In the accompanying drawings which are made a part of this application, Figure 1 is a side elevation of a wheel barrow, with my invention applied thereto. Fig. 2 is a detached side view, upon an enlarged scale, of said invention. Fig. 3 is a rear elevation thereof, partly in section on the line 3—3, Fig. 2.

In practicing my invention, I provide a runner-like member or shoe 1, preferably of cast metal, as iron, steel, or the like, as may be desired, or more suitable. Said member or runner 1 has its lower substantially horizontal portion 2 preferably of approximately inverted T-form or outline as indicated in Fig. 3, thus providing a broad traction surface or base 3 for stability and obtaining a ready gliding movement upon ice or snow to facilitate or expedite the moving of the wheel barrow. Said runner or member 1 has its base or lower portion slightly curved at the heel end, as at 4, and similarly curved, but to a greater extent, at its forward end, as at 5, the purpose of which is apparent. Said runner has an upper transverse portion 6 connected to the lower portion 2, the connection between said members 2 and 6 being effected by preferably inclined converging leg-like members or braces 7, integral or cast in one with said parts, as seen more particularly in Figs. 1 and 2, although more than two braces or leg-like members may be employed if desired. Said leg-like members or braces are arranged in a plane at right angles to the transverse portion 6 and have the point of convergence therebetween and said transverse portion about in vertical alinement with the axle rod 9 for reinforcing or bracing the point where the greatest pressure or stress is exerted, as is obvious.

The part or member 6 has its upper surface of right line construction and is provided at its ends with lateral upstanding ears 8, said ears being arranged a sufficient distance apart to provide for the ready and snug reception of the same between the axle carrying portions of the lower bars of the wheel barrow, as is apparent from Fig. 1. These ears are adapted to permit of the passing therethrough of the axle rod 9 forming a bearing for the wheel, which is displaced when the runner is used, as is also apparent in Fig. 1.

It will be noted that by means of the above-described contrivance or attachment for wheel barrows, the wheel thereof may be readily removed and said attachment be substituted therefor, as is desirable, particularly when snow and ice are upon the ground and thus lessen traction or friction in the effort to move the wheel barrow when loaded.

This attachment or contrivance, as noted, is also exceedingly simple, inexpensive and greatly desirable for its intended purpose, as will be readily appreciated.

I claim:

The combination with a wheelbarrow and axle rod; of a shoe of runner-like outline and of inverted T-shape in cross section, the stem thereof having integral therewith upwardly extending and inclined brace members, said members converging at their upper ends, a transverse bar formed integral with said brace members at their point of convergence and forming an approximate T member therewith, the ends of said transverse bar terminating in upstanding lateral ears, said ears being adapted to be received snugly between the axle carrying portions of said wheelbarrow and adapted to receive said axle rod in effecting connection between the same and said ears, said point of convergence between the brace members and said transverse bar being in vertical alinement with said axle rod where the strain and weight of said barrow is greatest.

In testimony whereof I have signed my name to this specification in the presence of two subscribing witnesses.

WILLIAM C. JOHNSON.

Witnesses:
WILLIAM C. HUBERKORN,
LARS WINKLER.